US012019453B2

(12) United States Patent
Su et al.

(10) Patent No.: US 12,019,453 B2
(45) Date of Patent: Jun. 25, 2024

(54) MULTI-SENSOR-FUSION-BASED AUTONOMOUS MOBILE ROBOT INDOOR AND OUTDOOR POSITIONING METHOD AND ROBOT

(71) Applicant: Institute of Intelligent Manufacturing, GDAS, Guangdong (CN)

(72) Inventors: Zerong Su, Guangzhou (CN); Xuefeng Zhou, Guangzhou (CN)

(73) Assignee: Institute of Intelligent Manufacturing, GDAS, Guangzhou (CN)

( * ) Notice: Subject to any disclaimer, the term of this patent is extended or adjusted under 35 U.S.C. 154(b) by 154 days.

(21) Appl. No.: 17/569,975

(22) Filed: Jan. 6, 2022

(65) Prior Publication Data

US 2023/0111122 A1 Apr. 13, 2023

(30) Foreign Application Priority Data

Oct. 8, 2021 (CN) .......................... 202111168105.4

(51) Int. Cl.
 *G05D 1/00* (2024.01)
(52) U.S. Cl.
 CPC ........... *G05D 1/0274* (2013.01); *G05D 1/024* (2013.01); *G05D 1/0255* (2013.01); *G05D 1/027* (2013.01); *G05D 1/0278* (2013.01)
(58) Field of Classification Search
 CPC .... G05D 1/0274; G05D 1/024; G05D 1/0255; G05D 1/027; G05D 1/0278; G05D 2201/02; G01C 21/165; G01C 21/1652; G01C 21/20; G01C 21/206; G01C 21/3841; G01S 17/86; G01S 19/45; G01S 19/47
See application file for complete search history.

(56) References Cited

U.S. PATENT DOCUMENTS

2015/0158182 A1\* 6/2015 Farlow ................ G05D 1/0274
 901/1

FOREIGN PATENT DOCUMENTS

| CN | 104143194 A | * | 11/2014 |
| CN | 104143194 A | | 11/2014 |
| CN | 105045263 B | | 5/2016 |

(Continued)

OTHER PUBLICATIONS

The State Intellectual Property Office of People's Republic of China: First Office Action for CN Application No. 202111168105.4 (priority application); dated Nov. 16, 2021; 25 pages.

*Primary Examiner* — Anne Marie Antonucci
*Assistant Examiner* — Jewel Ashley Kuntz

(57) ABSTRACT

The present application relates to a multi-sensor-fusion-based autonomous mobile robot indoor and outdoor positioning method and a robot. The method includes: acquiring GPS information and three-dimensional point cloud data of a robot at a current position; acquiring, a two-dimensional map corresponding to the GPS information of the robot at the current position; projecting the three-dimensional point cloud data of the robot at the current position onto a road surface where the robot is currently moving, to obtain two-dimensional point cloud data of the robot at the current position; and matching the two-dimensional point cloud data of the robot at the current position with the two-dimensional map corresponding to the GPS information of the robot at the current position, to determine the current position of the robot.

19 Claims, 4 Drawing Sheets

(56) References Cited

FOREIGN PATENT DOCUMENTS

| CN | 111429574 | A |   | 7/2020  |             |
|----|-----------|---|---|---------|-------------|
| CN | 111578932 | A |   | 8/2020  |             |
| CN | 111652926 | A |   | 9/2020  |             |
| CN | 111929699 | A |   | 11/2020 |             |
| CN | 112070800 | A |   | 12/2020 |             |
| CN | 112070800 | A | * | 12/2020 |             |
| CN | 112102151 | A |   | 12/2020 |             |
| CN | 112154303 | A |   | 12/2020 |             |
| CN | 112381919 | A | * | 2/2021  | ...... G06T 15/00 |
| CN | 112381919 | A |   | 2/2021  |             |
| CN | 112396656 | A |   | 2/2021  |             |
| CN | 112767490 | A |   | 5/2021  |             |
| CN | 109945856 | B |   | 7/2021  |             |
| CN | 113218408 | A |   | 8/2021  |             |
| CN | 111590595 | B |   | 9/2021  |             |
| CN | 113359810 | A |   | 9/2021  |             |
| CN | 113436260 | A |   | 9/2021  |             |

\* cited by examiner

MULTI-SENSOR-FUSION-BASED AUTONOMOUS MOBILE ROBOT INDOOR AND OUTDOOR POSITIONING METHOD AND ROBOT

CROSS-REFERENCE TO RELATED APPLICATIONS

This application claims benefit of Chinese Application No. 202111168105.4, filed Oct. 8, 2021, entitled MULTI-SENSOR-FUSION-BASED AUTONOMOUS MOBILE ROBOT INDOOR AND OUTDOOR POSITIONING METHOD AND ROBOT, the specification of which is incorporated by reference herein in its entirety.

TECHNICAL FIELD

The present application relates to the field of navigation technologies, and in particular, to a multi-sensor-fusion-based autonomous mobile robot indoor and outdoor positioning method and apparatus.

BACKGROUND

With the development of robot technologies, Autonomous Mobile Robots (AMRs) appear. The AMR is a machine with see-think-act capabilities, can sense an environment and establish an environment model independently, so as to acquire its pose information in the environment and plan and control movement of the robot.

In a conventional art, firstly, the robot is positioned, to determine a current position of the robot; then, a movement direction of the robot is determined according to the current position of the robot. For the current position of the robot, a position of the robot on a world map may be determined using a Global Positioning System (GPS), or a position of the robot on a point cloud map may be obtained by obtaining point cloud data by LiDAR scanning and matching the point cloud data with the point cloud map.

However, indoor applications of the GPS may be greatly interfered, and outdoor applications of the LiDAR may be affected by obstacles, so they cannot be applied to both indoor and outdoor scenarios.

SUMMARY

In view of the above, there is a need to provide, with respect to the above technical problems, a multi-sensor-fusion-based autonomous mobile robot indoor and outdoor positioning method and apparatus that can be applied to both indoor and outdoor scenarios.

A multi-sensor-fusion-based autonomous mobile robot indoor and outdoor positioning method, and the method includes:
  acquiring GPS information and three-dimensional point cloud data of a robot at a current position;
  acquiring, based on a correspondence relationship between GPS information and two-dimensional maps, a two-dimensional map corresponding to the GPS information of the robot at the current position, connection lines between three-dimensional coordinates corresponding to any two points on the two-dimensional map being at a substantially same angle with a horizontal plane;
  projecting the three-dimensional point cloud data of the robot at the current position onto a road surface where the robot is currently moving, to obtain two-dimensional point cloud data of the robot at the current position; and
  matching the two-dimensional point cloud data of the robot at the current position with the two-dimensional map corresponding to the GPS information of the robot at the current position, to determine the current position of the robot.

In one embodiment, the method further includes:
  controlling the robot to move according to a set route, and acquiring inertial measurement data, GPS information and three-dimensional point cloud data of the robot during the movement;
  determining a pose change of the robot during the movement based on the inertial measurement data of the robot during the movement; and
  projecting the three-dimensional point cloud data of the robot during the movement onto the road surface where the robot is moving, and establishing a two-dimensional map corresponding to the GPS information of the robot during the movement until a pitch angle corresponding to the pose change of the robot during the movement is greater than or equal to a set angle.

In one embodiment, the method further includes:
  separately projecting, if the pitch angle corresponding to the pose change of the robot during the movement is greater than or equal to the set angle, three-dimensional point cloud data after the pitch angle is greater than or equal to the set angle onto the road surface where the robot is moving, and re-establishing a new two-dimensional map corresponding to the GPS information of the robot during the movement until the pitch angle corresponding to the pose change of the robot during the movement is greater than or equal to the set angle again.

In one embodiment, the step of determining a pose change of the robot during the movement based on the inertial measurement data of the robot during the movement includes:
  determining a predicted value of the pose change of the robot during the movement based on the inertial measurement data of the robot during the movement;
  determining ground scanning points and object scanning points based on the three-dimensional point cloud data of the robot during the movement;
  performing feature extraction on the ground scanning points and the object scanning points, to determine a line feature point and a plane feature point; and
  substituting the predicted value of the pose change of the robot during the movement, coordinates of the line feature point and coordinates of the plane feature point into an error equation, to determine a pose change in the case of a minimum error value of the error equation as an actual value of the pose change of the robot during the movement.

In one embodiment, the step of determining ground scanning points and object scanning points based on the three-dimensional point cloud data of the robot during the movement includes:
  determining angles between connection lines of adjacent scanning points in a same horizontal direction and the horizontal plane based on the three-dimensional point cloud data of the robot during the movement;
  determining, if the angles between the connection lines of the adjacent scanning points in the same horizontal direction and the horizontal plane are 0, scanning points in the horizontal direction as ground scanning points;

determining, if an angle between a connection line of two adjacent non-ground scanning points and a scanning direction of one of the non-ground scanning points is within a set range, that the two non-ground scanning points belong to a same object; and determining, if a number of non-ground scanning points belonging to a same object is greater than or equal to a number threshold, the non-ground scanning points belonging to the same object as object scanning points.

In one embodiment, the method further includes:

performing distortion correction on the three-dimensional point cloud data of the robot during the movement based on the predicted value of the pose change of the robot during the movement.

In one embodiment, the method further includes:

classifying the three-dimensional point cloud data of the robot during the movement into circular rings with different diameters centered on a position of the robot, and counting numbers of scanning points in the circular rings; and if the numbers of the scanning points in the circular rings obtained from the three-dimensional point cloud data collected by the robot twice is the same, determining that the robot goes back to an original point, and ending the establishment of the two-dimensional map.

In one embodiment, the method further includes:

acquiring a movement path of the robot; and determining a wheel turning angle of the robot based on the movement path and the current position of the robot.

In one embodiment, the method further includes:

acquiring an ultrasonic measurement distance of the robot at the current position; and controlling the robot to pause the movement if the ultrasonic measurement distance of the robot at the current position is less than a first distance threshold.

A multi-sensor-fusion-based autonomous mobile robot indoor and outdoor positioning apparatus, and the apparatus includes:

a data acquisition module configured to acquire GPS information and three-dimensional point cloud data of a robot at a current position;

a map acquisition module configured to acquire, based on a correspondence relationship between GPS information and two-dimensional maps, a two-dimensional map corresponding to the GPS information of the robot at the current position, connection lines between three-dimensional coordinates corresponding to any two points on the two-dimensional map being at a substantially same angle with a horizontal plane;

a projection module configured to project the three-dimensional point cloud data of the robot at the current position onto a road surface where the robot is currently moving, to obtain two-dimensional point cloud data of the robot at the current position; and a matching module configured to match the two-dimensional point cloud data of the robot at the current position with the two-dimensional map corresponding to the GPS information of the robot at the current position, to determine the current position of the robot.

According to the above multi-sensor-fusion-based autonomous mobile robot indoor and outdoor positioning method and apparatus, firstly, GPS information of a robot at a current position is acquired, a two-dimensional map corresponding to the GPS information of the robot at the current position is acquired based on a correspondence relationship between GPS information and two-dimensional maps, connection lines between three-dimensional coordinates corresponding to any two points on the two-dimensional map are at a substantially same angle with a horizontal plane, and a two-dimensional map of a corresponding region may be acquired using the GPS information of the robot at the current position, so as to accurately define a general region of the current position of the robot. Then, three-dimensional point cloud data of the robot at the current position is acquired, the three-dimensional point cloud data of the robot at the current position is projected onto a road surface where the robot is currently moving, to obtain two-dimensional point cloud data of the robot at the current position, and the two-dimensional point cloud data of the robot at the current position is matched with the two-dimensional map corresponding to the GPS information of the robot at the current position, so as to accurately determine the current position of the robot in an approximate range defined. The current position of the robot is obtained from a combination of the GPS information and the three-dimensional point cloud data. A LiDAR may be used in indoor applications to compensate for errors caused by interference with a GPS, and the GPS may be used in outdoor applications to prevent errors caused by the influence of obstacles on the LiDAR. Accurate positioning of an autonomous mobile robot may be realized in indoor and outdoor scenarios simultaneously.

DETAILED DESCRIPTION

Figure 1:
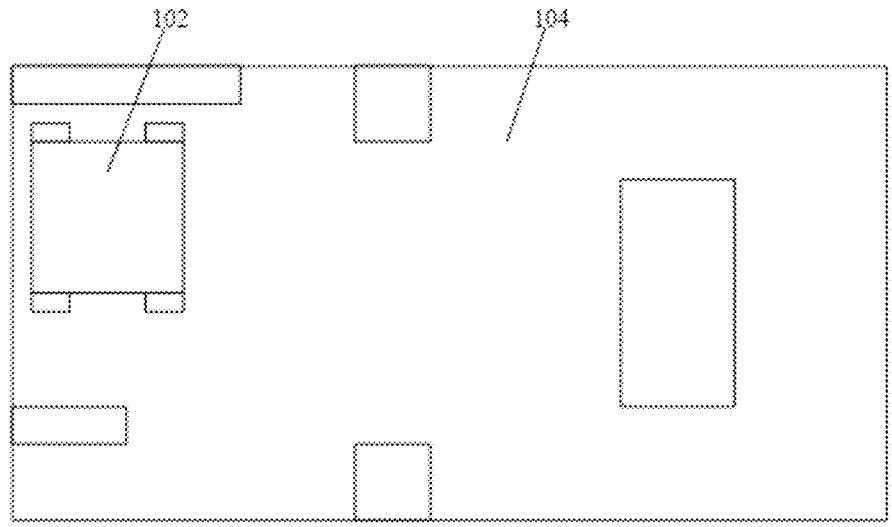
FIG. 1 is a diagram of an application environment of a multi-sensor-fusion-based autonomous mobile robot indoor and outdoor positioning method according to an embodiment.

In order to make the objectives, technical solutions and advantages of the present application more comprehensible, the present application is described in further detail below in conjunction with the accompanying drawings and embodiments. It should be understood that specific embodiments described herein are intended only to interpret the present application and not intended to limit the present application.

In recent years, rapid development of technologies such as 5th Generation Mobile Communication Technology (5G), Augmented Reality (AR), Virtual Reality (VR), cloud computing, big data, Internet of Things, artificial intelligence and robotics or the like has provided technological guarantee for transformation leap of relevant industries. In China, with the rapid growth of distribution requirements, the improvement in user experience and labor costs, as well as end distribution requirements in some remote regions and special environments being difficult to meet, the way of goods distribution has undergone significant changes. With the maturity of a driverless technology, unmanned distribution vehicles have been further developed. An unmanned distribution vehicle based on the driverless technology has a body covered with various types of high-sensitivity sensors to sense actual road conditions around it in real time. Real-time sensing of the sensors helps the unmanned distribution vehicle avoid possible delays, plan more direct and fast distribution routes, complete distribution tasks on time, and improve the efficiency of goods distribution. The unmanned distribution vehicle has become a general trend.

At present, a Global Navigation Satellite System (GNSS) sensor is generally included in an outdoor driverless technology, to indicate a physical world position thereof. In combination with GNSS signals, a map with latitude and longitude of the physical world may be constructed, so that the vehicle can acquire a position and navigate to another destination through the map. For unmanned vehicles running on highways and open scenarios, the GNSS may achieve higher positioning accuracy. However, unmanned vehicles distributed in outdoor parks are interfered by high buildings, forests and so on, so they cannot obtain good positioning information. Moreover, distribution vehicles in parks cannot receive GNSS signals when shuttling indoors. On the other hand, common indoor autonomous mobile robots mostly use a planar LiDAR for simultaneous localization and mapping (SLAM) indoors, having more obvious sensor data features. When the distribution service is expanded indoors and outdoors and switches from an indoor structured scenario to an outdoor unstructured scenario, conventional laser SLAM faces many challenges that lead to algorithm failure. For example, characteristics of obstacles such as thin layer, thinness and highness, and lowness and flatness may affect a positioning effect, thereby leading to inconsistency between the built map and a real environment.

In addition, the establishment of only a single plane map in an outdoor multi-slope scenario easily leads to inaccurate estimation of pitch ranging, resulting in inconsistency between deformation of the plane map and a real scenario and inaccurate or impossible positioning in navigation. The technical solution can effectively solve the problem and achieve accurate positioning in a regional map.

A multi-sensor-fusion-based autonomous mobile robot indoor and outdoor positioning method according to the present application may be applied to an application environment shown in FIG. 1. A robot 102 moves autonomously in a region 104. The robot 102 is covered with various types of high-sensitivity sensors, which can sense surrounding situations in real time, help the robot 102 avoid various obstacles in the region 104, and plan a route to move to a designated position, so as to realize unmanned distribution of goods. During the movement to the designated position, firstly, the robot 102 is required to be positioned. That is, a position of the robot 102 in the region 104 is determined. Then, a movement direction of the robot 102 is determined based on the position of the robot 102 in the region 104, so as to move according to a specified route.

Specifically, the robot 102 is positioned in the following manner: acquiring GPS information and three-dimensional point cloud data of a robot at a current position; acquiring, based on a correspondence relationship between GPS information and two-dimensional maps, a two-dimensional map corresponding to the GPS information of the robot at the current position, connection lines between three-dimensional coordinates corresponding to any two points on the two-dimensional map being at a substantially same angle with a horizontal plane; projecting the three-dimensional point cloud data of the robot at the current position onto a road surface where the robot is currently moving, to obtain two-dimensional point cloud data of the robot at the current position; and matching the two-dimensional point cloud data of the robot at the current position with the two-dimensional map corresponding to the GPS information of the robot at the current position, to determine the current position of the robot.

Figure 2:
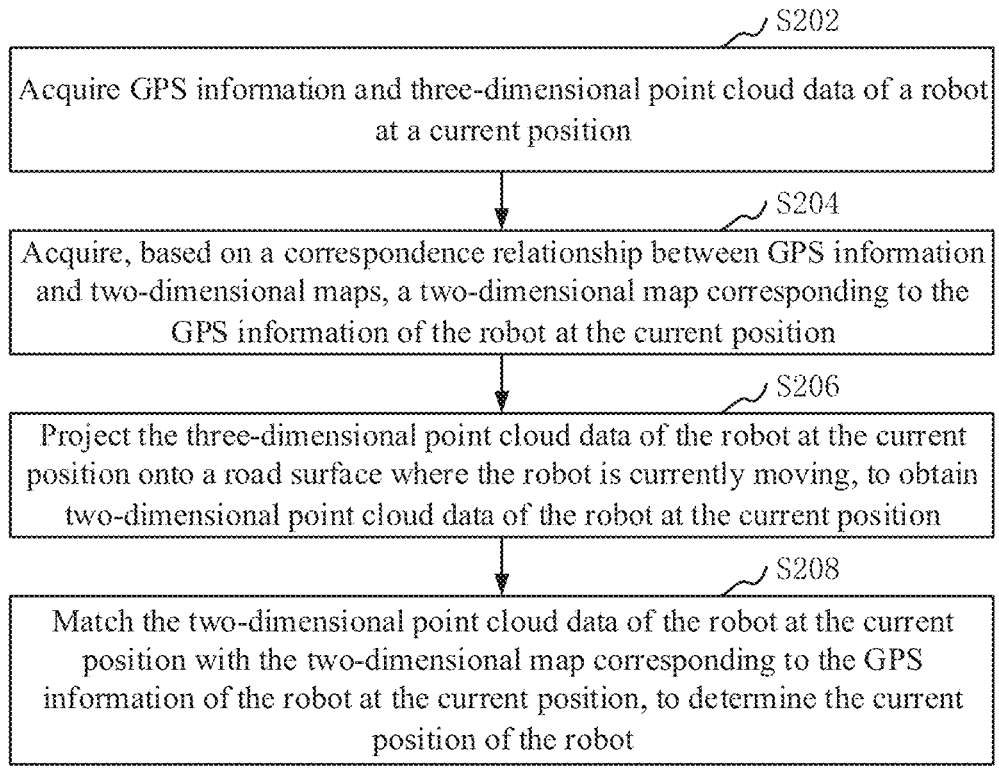
FIG. 2 is a schematic flowchart of the multi-sensor-fusion-based autonomous mobile robot indoor and outdoor positioning method according to an embodiment.

In one embodiment, as shown in FIG. 2, a multi-sensor-fusion-based autonomous mobile robot indoor and outdoor positioning method is provided. Description is provided with an example in which the method is applied to the robot in FIG. 1. The method includes the following steps.

In step S202, GPS information and three-dimensional point cloud data of a robot at a current position are acquired.

The GPS information is information obtained by GPS positioning, including time, latitude, latitude direction, longitude, longitude direction, solution state, number of satellites involved in calculation, horizontal accuracy factor, and the like.

The three-dimensional point cloud data is data obtained by using a LiDAR to emit laser, including coordinates of each laser reflection point.

Specifically, the robot is provided with a GPS receiver and a LiDAR. The GPS receiver receives, through antennas, satellite signals sent from a plurality of operational satellites and a number of corrections sent from a reference station. The number of corrections is obtained by comparing known accurate coordinates with calculated coordinates based on the satellite signals by the reference station. The GPS receiver eliminates, by using the number of corrections, errors in the calculated coordinates obtained based on the satellite signals, to obtain an exact position of the robot, i.e., the GPS information.

The GPS receiver analyzes data frames received into information such as latitude and longitude, heading angle and GPS positioning solution state. The GPS positioning solution state is divided into four states. When the solution state is a fixed solution, the analytical result can be used. When the solution state is one of a floating solution, a single point solution and invalid positioning, the analytical result is not adopted.

The LiDAR emits beams of light to the surroundings. The beams of light return back to the LiDAR after being reflected on a surface of an object. The LiDAR may determine orientation of the object and a distance between the object and the LiDAR based on emission directions of the reflected beams of light and a time difference between emission and receiving of the beams of light, and then establish the three-dimensional point cloud data.

In this embodiment, the simultaneous acquisition of the GPS information and the three-dimensional point cloud data of the robot at the current position may combine the GPS information and the three-dimensional point cloud data for use, to solve the problem that the GPS cannot be applied to indoor positioning and the LiDAR cannot be applied to outdoor positioning.

In step S204, a two-dimensional map corresponding to the GPS information of the robot at the current position is acquired based on a correspondence relationship between GPS information and two-dimensional maps.

Connection lines between three-dimensional coordinates corresponding to any two points on the two-dimensional map are at a substantially same angle with a horizontal plane. In practical applications, if a change in the angle between a connection line of three-dimensional coordinates corresponding to any two points on the two-dimensional map and the horizontal plane is less than a set angle, such as 5°, 10° or 15°, it is considered that the connection lines between three-dimensional coordinates corresponding to any two points on the two-dimensional map are at a substantially same angle with a horizontal plane so as to allow an angle change caused by ground unevenness.

In this embodiment, a pitch angle corresponding to a pose change in the movement of the robot on a same two-dimensional map is less than a set angle. That is, the robot moves on a plane. Three-dimensional point cloud data of the robot in this range is projected onto a moving road surface with almost no deformation, and accurate positioning of the robot may be realized according to two-dimensional point cloud data obtained.

Moreover, the two-dimensional map corresponds to the GPS information. Even if a position determined by the GPS information is not an exact position of the robot, the position may be very close to the exact position of the robot. Therefore, an approximate range of the current position of the robot may be accurately determined using the GPS information. That is, the two-dimensional map corresponding to the GPS information of the robot at the current position is acquired, and the exact position of the robot is then found in the two-dimensional map.

In step S206, the three-dimensional point cloud data of the robot at the current position is projected onto a road surface where the robot is currently moving, to obtain two-dimensional point cloud data of the robot at the current position.

Specifically, a road surface where the robot is currently moving is taken as a projection plane, the three-dimensional point cloud data of the robot at the current position is projected onto the projection plane, and the two-dimensional point cloud data of the robot at the current position is formed by points closest to the robot from the robot in various directions away from the robot.

In step S208, the two-dimensional point cloud data of the robot at the current position is matched with the two-dimensional map corresponding to the GPS information of the robot at the current position, to determine the current position of the robot.

Specifically, two-dimensional point cloud data of various positions in the two-dimensional map corresponding to the GPS information of the robot at the current position is matched with the two-dimensional point cloud data of the robot at the current position, and the position with the highest matching degree is selected as the current position of the robot.

According to the above multi-sensor-fusion-based autonomous mobile robot indoor and outdoor positioning method, firstly, GPS information of a robot at a current position is acquired, a two-dimensional map corresponding to the GPS information of the robot at the current position is acquired based on a correspondence relationship between GPS information and two-dimensional maps, connection lines between three-dimensional coordinates corresponding to any two points on the two-dimensional map are at a substantially same angle with a horizontal plane, and a two-dimensional map of a corresponding region may be acquired using the GPS information of the robot at the current position, so as to accurately define a general region of the current position of the robot. Then, three-dimensional point cloud data of the robot at the current position is acquired, the three-dimensional point cloud data of the robot at the current position is projected onto a road surface where the robot is currently moving, to obtain two-dimensional point cloud data of the robot at the current position, and the two-dimensional point cloud data of the robot at the current position is matched with the two-dimensional map corresponding to the GPS information of the robot at the current position, so as to accurately determine the current position of the robot in an approximate range defined. The current position of the robot is obtained from a combination of the GPS information and the three-dimensional point cloud data. A LiDAR may be used in indoor applications to compensate for errors caused by interference with a GPS, and the GPS may be used in outdoor applications to prevent errors caused by the influence of obstacles on the LiDAR. Accurate positioning of an autonomous mobile robot may be realized in indoor and outdoor scenarios simultaneously.

Figure 3:
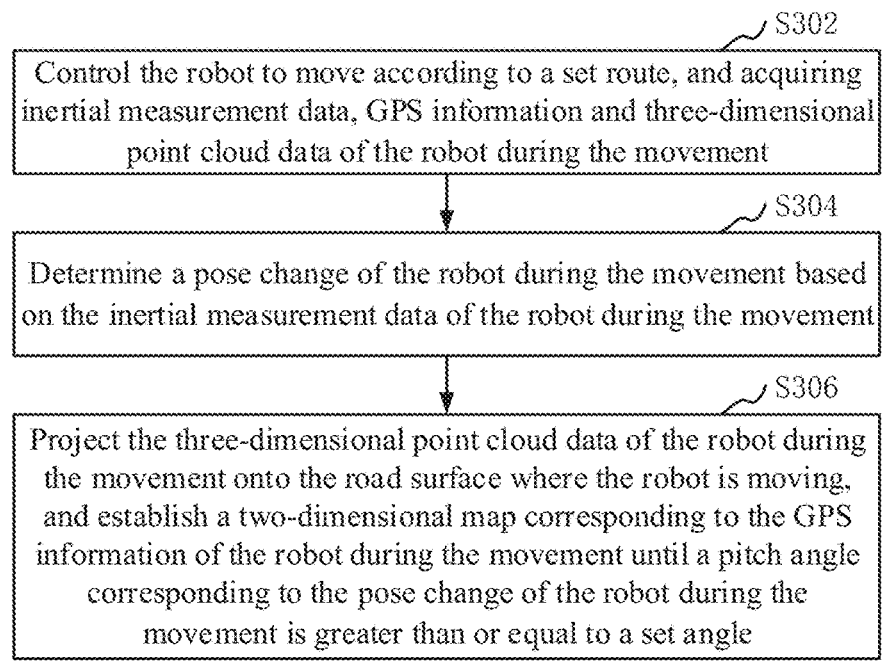
FIG. 3 is a schematic flowchart of the multi-sensor-fusion-based autonomous mobile robot indoor and outdoor positioning method according to another embodiment.

In one embodiment, as shown in FIG. 3, the method further includes the following steps.

In step S302, the robot is controlled to move according to a set route, and inertial measurement data, GPS information and three-dimensional point cloud data of the robot during the movement are acquired.

The set route may be a route planned in advance and inputted to the robot, or a route selected by the robot based on an actual situation during the movement.

The inertial measurement data is measurement data of an Inertial Measurement Unit (IMU), including accelerations and angular velocities of three single axes.

Specifically, the robot is provided with an IMU. The IMU detects the robot during the movement in real time to obtain the inertial measurement data. In addition, the robot is provided with a GPS receiver and a LiDAR. The GPS receiver receives, in real time, satellite signals sent from a plurality of operational satellites and a number of corrections sent from a reference station during the movement of the robot, to obtain an exact position of the robot, i.e., the GPS information. During the movement of the robot, the LiDAR emits beams of light around in real time and receives beams of light reflected from a surface of an object, and determines orientation of the object and a distance between the object and the LiDAR based on emission directions of the reflected beams of light and a time difference between emission and receiving of the beams of light, to establish the three-dimensional point cloud data.

In step S304, a pose change of the robot during the movement is determined based on the inertial measurement data of the robot during the movement.

Specifically, step S304 includes the following steps.

In a first step, a predicted value of the pose change of the robot during the movement is determined based on the inertial measurement data of the robot during the movement.

Exemplarily, the first step includes:

determining the predicted value of the pose change of the robot during the movement according to the following formulas:

$$p_j = p_i + \sum_{k=j}^{j-1}\left[v_k\Delta t + \frac{1}{2}g^W\Delta t^2 + \frac{1}{2}R_k(a_k - b_a)\Delta t^2\right];$$

$$v_j = v_i + g^W\Delta t + \sum_{k=i}^{j-1}R_k(a_k - b_a)\Delta t;$$

$$q_j = q_i \otimes \prod_{k=i}^{j-1}\delta q_k = q_i \otimes \prod_{k=i}^{j-1}\begin{bmatrix}\frac{1}{2}\Delta t(\omega_k - b_\omega)\\1\end{bmatrix};$$

where $p_j$ and $p_i$ denote the $j^{th}$ position and the $i^{th}$ position of the robot respectively, $v_k$, $v_j$ and $v_i$ denote a velocity of the robot at the $k^{th}$ position, a velocity at the $j^{th}$ position and a velocity at the $i^{th}$ position respectively, $\Delta t$ denotes a time difference of the robot from the $i^{th}$ position to the $j^{th}$ position, $g^W$ denotes gravitational acceleration, $R_k$ denotes a rotation matrix in which the robot at the $k^{th}$ position transforms from an IMU coordinate system to a world coordinate system, $a_k$ denotes acceleration of the robot at the $k^{th}$ position, $b_a$ denotes acceleration drift of the IMU, $q_j$ and $q_i$ denote a rotation posture of the robot at the $j^{th}$ position and a rotation posture at the $i^{th}$ position respectively, $w_k$ denotes an angular velocity of the robot at the $k^{th}$ position, and $b_w$ denotes angular velocity drift of the IMU.

In a second step, ground scanning points and object scanning points are determined based on the three-dimensional point cloud data of the robot during the movement.

Exemplarily, the method further includes: performing distortion correction on the three-dimensional point cloud data of the robot during the movement based on the predicted value of the pose change of the robot during the movement.

Specifically, the step of performing distortion correction on the three-dimensional point cloud data of the robot during the movement based on the predicted value of the pose change of the robot during the movement includes: determining a pose transformation of the robot between two time points based on the predicted value of the pose change of the robot during the movement; and subtracting the pose transformation of the robot between the two time points from three-dimensional point cloud data of the robot at the latter time point.

Figure 4:
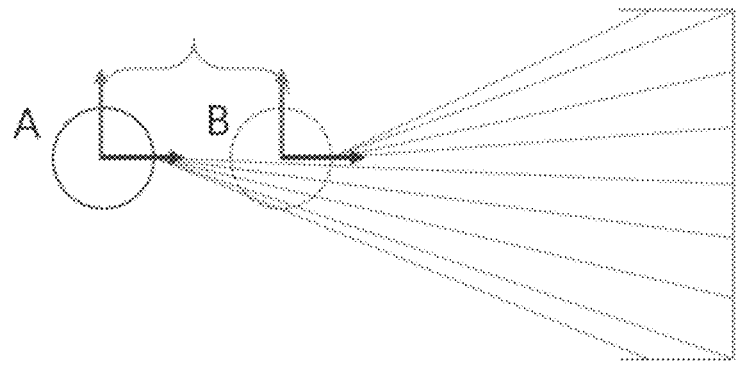
FIG. 4 is a schematic diagram of distortion correction on three-dimensional point cloud data according to an embodiment.

For example, as shown in FIG. 4, a pose transformation $R_k$ of the LiDAR between a time point A and a time point B is determined first, and the pose transformation $R_k$ is then subtracted from three-dimensional point cloud data of the LiDAR at the time point B, to complete the distortion correction.

In practical applications, disordered point cloud data obtained by the LiDAR is first converted into an ordered depth matrix to facilitate subsequent data processing. Specifically, data in a same row of the ordered depth matrix is in one-to-one correspondence to beams of the LiDAR in a same vertical plane, and data in a same column of the ordered depth matrix is in a one-to-many relationship with beams of the LiDAR in a same horizontal plane. An amount of the data in the same column of the ordered depth matrix is limited by a level of data processing and is generally less than a number of the beams of the LiDAR in the same horizontal plane. Therefore, a plurality of adjacent beams of the LiDAR on the same horizontal plane correspond to one piece of data in one column of the ordered depth matrix. Each data value in the ordered depth matrix is a statistical value of reflection distances of a plurality of corresponding beams. The statistical value is a maximum, minimum, or average value.

After the ordered depth matrix, whether scanning points in various horizontal directions are ground scanning points is firstly determined, to obtain a set of the ground scanning points. Then, after the set of the ground scanning points is removed from the ordered depth matrix, a set of scanning points belonging to a same object is determined, and a set of scanning points in which the number of scanning points is less than a number threshold are removed from the set of the scanning points for each object, to obtain an object scanning point set.

Exemplarily, the second step includes: determining angles between connection lines of any of adjacent scanning points in a same horizontal direction and the horizontal plane based on the three-dimensional point cloud data of the robot during the movement; determining, if the angles between the connection lines of any of the adjacent scanning points in the same horizontal direction and the horizontal plane are 0, the scanning points in the same horizontal direction as the ground scanning points; determining, if an angle between a connection line of two adjacent non-ground scanning points and a scanning direction of one of the two non-ground scanning points is within a set range, that the two non-ground scanning points belong to a same object; and determining, if a number of non-ground scanning points belonging to a same object is greater than or equal to the number threshold, the non-ground scanning points belonging to the same object as the object scanning points.

Figure 5:
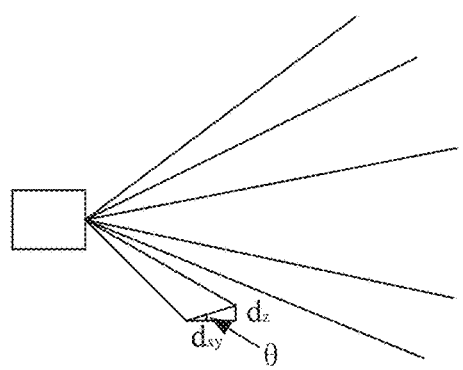
FIG. 5 is a schematic diagram of determination of ground scanning points according to an embodiment.

For example, as shown in FIG. 5, a distance difference $d_{xy}=\text{sqrt}(d_x+d_y)$ of the connection line of two adjacent scanning points in the same horizontal direction and a distance difference $d_z$ in the vertical direction are determined, and then a vertical angle $\theta=\arctan(d_z/d_{xy})$ of the two scanning points is calculated, that is, an angle between a connection line of adjacent scanning points in the horizontal direction and the horizontal plane. If the angles between the connection lines of any of the adjacent scanning points in the same horizontal direction and the horizontal plane are 0, the scanning points in this horizontal direction are determined as ground scanning points. If the angle between at least one connection line of the adjacent scanning points in the same horizontal direction and the horizontal plane is greater than 0, the scanning points in this horizontal direction are determined as non-ground scanning points.

Figure 6:
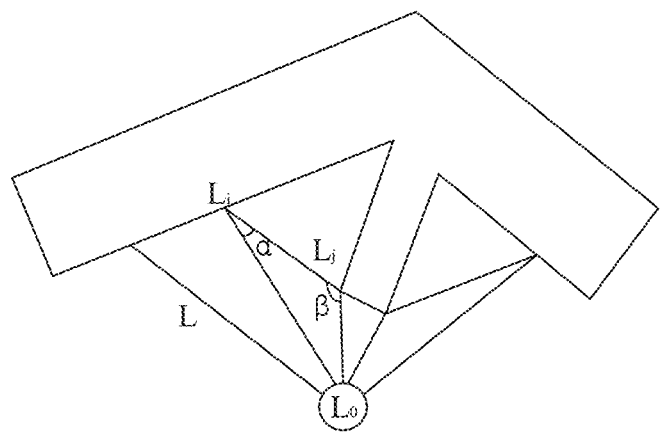
FIG. 6 is a schematic diagram of determination of object scanning points according to an embodiment.

In another example, as shown in FIG. 6, an angle $\alpha$ between a connection line $L_iL_j$ of two adjacent scanning points $L_i$ and $L_j$ of a laser beam L emitted by a LiDAR $L_0$ and a scanning direction of the scanning point $L_i$ (i.e., a connection line between the scanning point $L_i$ and the LiDAR $L_0$), or an angle $\beta$ between the connection line and a scanning direction of the scanning point $L_j$ (i.e., a connection line between the scanning point $L_j$ and the LiDAR $L_0$) is determined. If $\alpha$ or $\beta$ is within the set range, it is determined that the scanning points $L_i$ and $L_j$ belong to a same object. If $\alpha$ or $\beta$ is outside the set range, it is determined that the scanning points $L_i$ and $L_j$ belong to different objects.

In a third step, feature extraction is performed on the ground scanning point and the object scanning point, to determine a line feature point and a plane feature point.

Specifically, a feature value of a scanning point is determined according to the following formula:

$$\Theta = \frac{1}{|S| \cdot \|P'_i\|} \cdot \left\| \sum_{j \in S, j \neq i} (P'_j - P'_i) \right\|;$$

where $P'_i$ and $P'_j$ denote values of two scanning points respectively, $\Theta$ denotes a feature value of a scanning point corresponding to $P'_i$, and S denotes a neighborhood size of a scanning point corresponding to $P'_j$.

If a feature value of a non-ground scanning point is greater than or equal to a feature threshold, the non-ground scanning point is determined as a line feature point.

If a feature value of a scanning point is less than the feature threshold, the scanning point is determined as a plane feature point.

In a fourth step, the predicted value of the pose change of the robot during the movement, coordinates of the line feature point and coordinates of the plane feature point are substituted into an error equation, to determine a pose change in the case of a minimum error value of the error equation as an actual value of the pose change of the robot during the movement.

Specifically, the fourth step includes:
calculating a minimum error value of the error equation by using the following formula set:

$$\min_{T_k^L} \|E_L^2 + E_B^2\|; \quad \frac{|(\hat{\mathbb{P}}_{k,i}^L - \mathbb{P}_{k-1,l}^L) \times (\hat{\mathbb{P}}_{k,i}^L - \mathbb{P}_{k-1,j}^L)|}{|\mathbb{P}_{k-1,l}^L - \mathbb{P}_{k-1,j}^L|}, i \in \mathbb{P}^L$$

$$E = \begin{cases} \frac{|(\hat{\mathbb{P}}_{k,i}^P - \mathbb{P}_{k-1,j}^P)(\hat{\mathbb{P}}_{k-1,j}^P - \mathbb{P}_{k-1,l}^P) \times (\hat{\mathbb{P}}_{k-1,m}^P - \mathbb{P}_{k-1,j}^P)|}{|\mathbb{P}_{k-1,j}^P - \mathbb{P}_{k-1,l}^P) \times (\hat{\mathbb{P}}_{k-1,m}^P - \mathbb{P}_{k-1,j}^P)|}, i \in \mathbb{P}^P \end{cases};$$

$$E_B = \begin{bmatrix} \delta\alpha_k^{k-1} \\ \delta\beta_k^{k-1} \\ \delta\theta_k^{k-1} \\ \delta b_a \\ \delta b_\omega \end{bmatrix} = \begin{bmatrix} p_k - p_{k-1} + \frac{1}{2} g^W \Delta t_{k-1}^2 - v_k \Delta t_{k-1} - a_k^{k-1} \\ v_k + g^W \Delta t_{k-1} - v_{k-1} - \beta_k^{k-1} \\ 2[q_{k-1} \otimes q_k (\theta_k^{k-1})^{-1}]_{xyz} \\ b_{a,k} - b_{a,k-1} \\ b_{\omega,k} - b_{\omega,k-1} \end{bmatrix};$$

where $T_k^L$ denotes a predicted value of the pose change of the robot during the movement, $E_L$ denotes an error value of feature matching for laser point cloud data, $E_B$ denotes an error value of coordinate transformation for the inertial measurement data, $\mathbb{P}^L$ denotes the line feature point, $\mathbb{P}^P$ denotes the plane feature point, $\hat{\mathbb{P}}_{k,i}^L$ denotes the line feature point in $\mathbb{P}_k$, $\hat{\mathbb{P}}_k$ denotes a projection of $\mathbb{P}_k$ in a coordinate system $\mathbb{P}_{k,i}$ at time k by taking the coordinate system as a reference, $\hat{\mathbb{P}}_k = R \cdot \mathbb{P}_k + p$, R is a rotation matrix in TkL, p is a translation matrix in TkL, $\mathbb{P}_{k-1,j}^L$ is a nearest neighbor homogeneous feature point in $\mathbb{P}_{k-1}$, $\mathbb{P}_{k-1,l}^L$ denotes a nearest neighbor point of $\mathbb{P}_{k-1,j}^L$ in an adjacent channel, $\hat{\mathbb{P}}_{k,i}^P$ denotes a plane feature point in $\mathbb{P}_k$, $\mathbb{P}_{k-1,j}^P$ denotes a nearest neighbor homogeneous feature point of $\mathbb{P}_{k-1}$, $\mathbb{P}_{k-1,l}^P$ denotes a nearest neighbor point of $\mathbb{P}_{k-1,j}^P$ in an adjacent channel, $\mathbb{P}_{k-1,m}^P$ denotes a nearest neighbor point of $\mathbb{P}_{k-1,j}^P$ in a same channel, $\delta\alpha_k^{k-1}$, $\delta\beta_k^{k-1}$, $\delta\theta_k^{k-1}$, $\delta b_a$, $\delta b_\omega$ denote position, velocity, angle, acceleration deviation, angular velocity deviation respectively, $p_k$ and $p_{k-1}$ denote the $k^{th}$ position and the $k-1^{th}$ position of the robot respectively, $g^w$ denotes gravitational acceleration, $\Delta t_{k-1}$ denotes a time difference of the robot from the $k-1^{th}$ position to the $k^{th}$ position, $v_k$ and $v_{k-1}$ denote a velocity of the robot at the $k^{th}$ position and a velocity at the $k-1^{th}$ position respectively, $a_k^{k-1}$ denotes acceleration of the robot at the $k^{th}$ position, $b_{a,k}$ and $b_{a,k-1}$ denote acceleration drift of the IMU at the $k^{th}$ position and acceleration drift at the $k-1^{th}$ position respectively, $b_{w,k}$ and $b_{w,k-1}$ denote angular velocity drift of the IMU at the $k^{th}$ position and angular velocity drift at the $k-1^{th}$ position respectively, $\beta_k^{k-1}$ denotes a velocity of the robot from the $k-1^{th}$ position to the $k^{th}$ position, $\theta_k^{k-1}$ denotes an angle of the robot from the $k-1^{th}$ position to the $k^{th}$ position, and $q_{k-1}$ and $q_k$ denote a posture of the robot at the $k-1^{th}$ position and a posture at the $k^{th}$ position respectively.

In practical applications, since $T_k^L$ includes only position and angle information, $$E_B = [\delta\alpha_k^{k-1} \quad \delta\theta_k^{k-1}]^T.$$

In step S306, the three-dimensional point cloud data of the robot during the movement is projected onto the road surface where the robot is moving, and a two-dimensional map corresponding to the GPS information of the robot during the movement is established until a pitch angle corresponding to the pose change of the robot during the movement is greater than or equal to a set angle.

Specifically, the three-dimensional point cloud data obtained by the LiDAR is registered by searching nearest neighbor points in a k-dimensional (KD) tree, to establish three-dimensional maps. Two-dimensional maps are established by planarization compression on the three-dimensional maps. The two-dimensional maps are bound to GPS information, and the corresponding two-dimensional maps may be obtained through the GPS information.

In one embodiment, the method further includes: separately projecting, if the pitch angle corresponding to the pose change of the robot during the movement is greater than or equal to the set angle, three-dimensional point cloud data after the pitch angle is greater than or equal to the set angle onto the road surface where the robot is moving, and re-establishing a new two-dimensional map corresponding to the GPS information of the robot during the movement until the pitch angle corresponding to the pose change of the robot during the movement is greater than or equal to the set angle again.

In practical applications, if the pitch angle corresponding to the pose change of the robot during the movement is greater than or equal to the set angle, a new two-dimensional map is re-established to adapt to a new road slope. At the same time, the original two-dimensional map may be continuously established until a movement distance of the robot reaches a distance threshold, to ensure integrity of the two-dimensional map.

Exemplarily, the distance threshold is twice a detection distance of a sensor.

Figure 7:
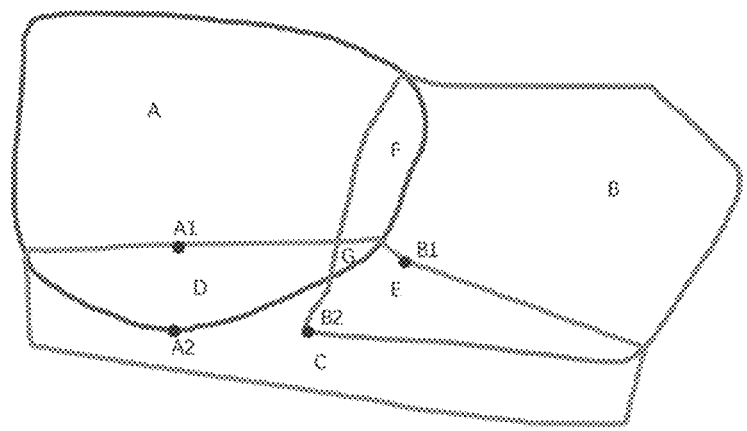
FIG. 7 is a schematic diagram of establishment of a two-dimensional map according to an embodiment.

For example, as shown in FIG. 7, a two-dimensional map A is firstly established. When the robot moves to a point A1, the IMU detects that the road slope reaches a threshold. At this point, a two-dimensional map C is re-established, and the establishment of the two-dimensional map A is continued. When the robot moves to a point A2, the moving distance of the robot (i.e., a distance between A1 and A2) reaches the distance threshold. In this case, the establishment of the two-dimensional map A is stopped, the establishment of the two-dimensional map C is continued, and an overlapping region D exists between the two-dimensional map C and the two-dimensional map A.

In one embodiment, the method further includes: classifying the three-dimensional point cloud data of the robot during the movement into circular rings with different diameters centered on a position of the robot, and counting numbers of scanning points in the circular rings; and if the numbers of the scanning points in the circular rings obtained from the three-dimensional point cloud data collected by the robot twice is the same, determining that the robot goes back to the original point, and ending the establishment of the two-dimensional map.

Specifically, the three-dimensional point cloud data is compressed into a vector $K_{sc}$ by using the following formula:

$$K_{sc}=(\phi(M_{r1}), \ldots, \phi(M_{rc}));$$

$$\phi(M_{ri}) = \frac{M_{ri}}{N_n};$$

where $M_{r1}$ and $M_{rc}$ denote a number of scanning points in the $1^{st}$ circular ring and a number of scanning points in the $r^{th}$ circular ring in the three-dimensional point cloud data, and $N_n$ denotes a maximum value of the number of scanning points in the $i^{th}$ circular ring in the three-dimensional point cloud data.

The vector $K_{sc}$ is used to search the KD tree for multi-frame three-dimensional point cloud data with the highest similarity, and when the similarity reaches the threshold, loopback is detected. That is, the robot goes back to the original point. In this case, the establishment of the two-dimensional map is ended.

Exemplarily, a difference between radii of two adjacent circular rings is calculated using the following formula:

$$W_c = \frac{B_{max}}{N_c};$$

where $W_c$ denotes the difference between radii of two adjacent circular rings, $B_{max}$ denotes a maximum distance of a laser point, and $N_c$ denotes the number of circular rings.

In practical applications, each time a new factor node is inserted (at least one of update of inertial measurement data, update of three-dimensional point cloud data and detection of a closed loop), the data is optimized once. To ensure real-time performance, parallel running on three threads is possible.

In this embodiment, the robot is controlled to move according to a set route, and inertial measurement data, GPS information and three-dimensional point cloud data of the robot during the movement are acquired for subsequent use. Specifically, the pose change of the robot during the movement is determined based on the inertial measurement data of the robot during the movement, from which a size relationship between the pitch angle corresponding to the pose change of the robot during the movement and the set angle may be determined. The three-dimensional point cloud data of the robot during the movement is projected onto the road surface where the robot is moving, and the two-dimensional map corresponding to the GPS information of the robot during the movement is established until the pitch angle corresponding to the pose change of the robot during the movement is greater than or equal to the set angle, so that a two-dimensional map for positioning of the robot may be accurately established by integrating the inertial measurement data, the GPS information and the three-dimensional point cloud data, to accurately position the robot.

In practical applications, path planning may be performed in real time based on the constructed two-dimensional map. Based on position information of obstacles such as walls and furniture, distance information of the nearest obstacle is used to set a cost value, and buffer zones are arranged around the obstacle, to perform optimal path evaluation and calculation. A path to a final target or a long-distance target may be established by global planning specifically by using an algorithm such as A* (A-star), Dijkstra, D* (D-star), LPA* (Lifelong Planning A*), D* lite or RRT. A path to a close-distance target and to temporarily avoid obstacles may be established by local planning specifically by using an algorithm such as TEB, DWA or eband.

After the path planning, positioning information of the robot may be obtained continuously according to starting point, passing point and ending point information of an incoming path of an algorithm, and a control quantity of a piecewise tracking trajectory is calculated by using a geometric-tracking-based tracking algorithm, so that the robot realizes path tracking on a target passing point.

In one embodiment, the method further includes: acquiring a movement path of the robot; and determining a wheel turning angle of the robot based on the movement path and the current position of the robot.

Figure 8:
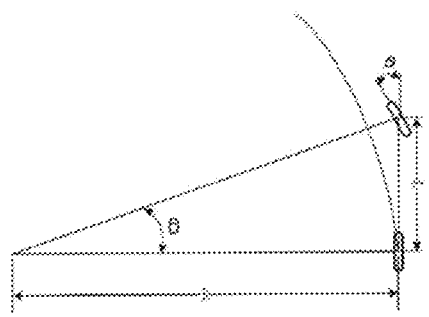
FIG. 8 is a schematic diagram of a motion state of a robot according to an embodiment.
Figure 9:
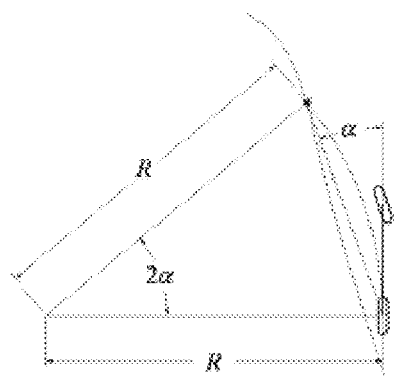
FIG. 9 is a schematic diagram of path tracking for the robot according to an embodiment.

According to the symmetry of the Ackerman steering structure, a motion model of the robot may be simplified into the structure shown in FIG. 8. A turning radius is R, a front wheel turning angle is θ, and a distance between front and rear wheels is L. A pure tracking algorithm takes a rear axle of a vehicle as a tangent point and a longitudinal body of the vehicle as a tangent line. By controlling the front wheel turning angle, the vehicle may drive along an arc that passes through a target road point, as shown in FIG. 9. According to the law of sines and the geometric principle, a front wheel turning angle control function may be obtained.

Specifically, the step of determining a wheel turning angle of the robot based on the movement path and the current position of the robot includes:

calculating the wheel turning angle of the robot according to the following formula:

$$\theta(t) = \tan^{-1}\left(\frac{2*L*\sin(\alpha(t))}{k*v_x(t)}\right);$$

where θ(t) denotes a front wheel turning angle of the robot, t denotes time, L denotes a distance between front and rear wheels of the robot, α denotes half of an angle between a connection line of a target position and a circle center of turning of the robot and a connection line of the current position and the circle center of the turning of the robot, k denotes a set coefficient, and $v_x$ denotes a movement velocity of the robot in a forward direction.

In one embodiment, the method further includes: acquiring an ultrasonic measurement distance of the robot at the current position; and controlling the robot to pause the movement if the ultrasonic measurement distance of the robot at the current position is less than a first distance threshold.

Specifically, the method further includes: determining a laser measurement distance of the robot at the current position based on the three-dimensional point cloud data after the distortion correction; and controlling the robot to reduce a movement velocity if the laser measurement distance of the robot at the current position is less than a second distance threshold.

The LiDAR may measure a distance up to 100 meters, which is featured with a long distance, a large amount of data and longer processing time, and is thus suitable for long-distance obstacle avoidance. An ultrasonic wave may measure a distance of 5 meters, which is featured with a short distance, a small amount of data and rapid processing, and is thus suitable for short-distance obstacle avoidance. To sum up, emergency obstacle avoidance and emergency self-safety protection of the robot can be realized.

In addition, the robot is provided with a human-computer interaction module, which, on the one hand, may display information of the robot, such as sensor data, map and positioning information, a selected path and a real-time trajectory, and on the other hand, may also set tasks such as a control mode, trajectory recording and reproduction, and map editing and modification.

It should be understood that, although the steps in the flowchart of FIG. 2 to FIG. 3 are displayed in sequence as indicated by the arrows, the steps are not necessarily performed in the order indicated by the arrows. Unless otherwise clearly specified herein, the steps are performed without any strict sequence limitation, and may be performed in other orders. In addition, at least some steps in FIG. 2 to FIG. 3 may include a plurality of steps or a plurality of stages, and such steps or stages are not necessarily performed at a same moment, and may be performed at different moments. The steps or stages are not necessarily performed in sequence, and the steps or stages and at least some of other steps or steps or stages of other steps may be performed in turn or alternately.

Figure 10:
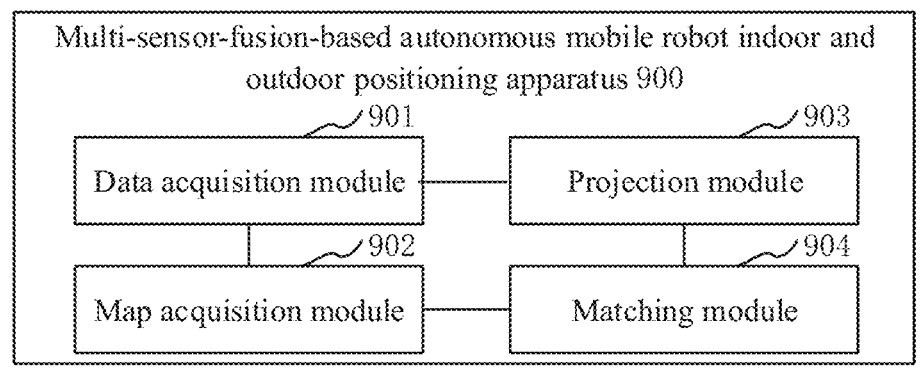
FIG. 10 is a structural block diagram of the multi-sensor-fusion-based autonomous mobile robot indoor and outdoor positioning apparatus according to an embodiment.

In one embodiment, as shown in FIG. 10, a multi-sensor-fusion-based autonomous mobile robot indoor and outdoor positioning apparatus 900 is provided, including a data acquisition module 901, a map acquisition module 902, a projection module 903 and a matching module 904.

The data acquisition module 901 is configured to acquire GPS information and three-dimensional point cloud data of a robot at a current position.

The map acquisition module 902 is configured to acquire, based on a correspondence relationship between GPS information and two-dimensional maps, a two-dimensional map corresponding to the GPS information of the robot at the current position, and connection lines between three-dimensional coordinates corresponding to any two points on the two-dimensional map are at a substantially same angle with a horizontal plane.

The projection module 903 is configured to project the three-dimensional point cloud data of the robot at the current position onto a road surface where the robot is currently moving, to obtain two-dimensional point cloud data of the robot at the current position.

The matching module 904 is configured to match the two-dimensional point cloud data of the robot at the current position with the two-dimensional map corresponding to the GPS information of the robot at the current position, to determine the current position of the robot.

According to the above multi-sensor-fusion-based autonomous mobile robot indoor and outdoor positioning apparatus, firstly, GPS information of a robot at a current position is acquired, a two-dimensional map corresponding to the GPS information of the robot at the current position is acquired based on a correspondence relationship between GPS information and two-dimensional maps, connection lines between three-dimensional coordinates corresponding to any two points on the two-dimensional map are at a substantially same angle with a horizontal plane, and a two-dimensional map of a corresponding region may be acquired using the GPS information of the robot at the current position, so as to accurately define a general region of the current position of the robot. Then, three-dimensional point cloud data of the robot at the current position is acquired, the three-dimensional point cloud data of the robot at the current position is projected onto a road surface where the robot is currently moving, to obtain two-dimensional point cloud data of the robot at the current position, and the two-dimensional point cloud data of the robot at the current position is matched with the two-dimensional map corresponding to the GPS information of the robot at the current position, so as to accurately determine the current position of the robot in an approximate range defined. The current position of the robot is obtained from a combination of the GPS information and the three-dimensional point cloud data. A LiDAR may be used in indoor applications to compensate for errors caused by interference with a GPS, and the GPS may be used in outdoor applications to prevent errors caused by the influence of obstacles on the LiDAR. Accurate positioning of an autonomous mobile robot may be realized in indoor and outdoor scenarios simultaneously.

In one embodiment, the data acquisition module 901 is further configured to control the robot to move according to a set route, and acquire inertial measurement data, GPS information and three-dimensional point cloud data of the robot during the movement. Correspondingly, the apparatus further includes: a pose determination module and a map establishment module. The pose determination module is configured to determine a pose change of the robot during the movement based on the inertial measurement data of the robot during the movement. The map establishment module is configured to project the three-dimensional point cloud data of the robot during the movement onto the road surface where the robot is moving, and establish a two-dimensional map corresponding to the GPS information of the robot during the movement until a pitch angle corresponding to the pose change of the robot during the movement is greater than or equal to a set angle.

In one embodiment, the map establishment module is further configured to separately project, if the pitch angle corresponding to the pose change of the robot during the movement is greater than or equal to the set angle, three-dimensional point cloud data after the pitch angle is greater than or equal to the set angle onto the road surface where the robot is moving, and re-establish a new two-dimensional map corresponding to the GPS information of the robot during the movement until the pitch angle corresponding to the pose change of the robot during the movement is greater than or equal to the set angle again.

In one embodiment, the pose determination module includes a pose estimation unit, a scanning point determination unit, a feature point determination unit and a pose determination unit. The pose estimation unit is configured to determine a predicted value of the pose change of the robot during the movement based on the inertial measurement data of the robot during the movement. The scanning point determination unit is configured to determine ground scanning points and object scanning points based on the three-dimensional point cloud data of the robot during the movement. The feature point determination unit is configured to perform feature extraction on the ground scanning points and the object scanning points, to determine a line feature point and a plane feature point. The pose determination unit is configured to substitute the predicted value of the pose change of the robot during the movement, coordinates of the line feature point and coordinates of the plane feature point into an error equation, to determine a pose change in the case of a minimum error value of the error equation as an actual value of the pose change of the robot during the movement.

In one embodiment, the scanning point determination unit is configured to determine angles between connection lines of adjacent scanning points in a same horizontal direction and the horizontal plane based on the three-dimensional point cloud data of the robot during the movement; determine, if the angles between the connection lines of the adjacent scanning points in the same horizontal direction and the horizontal plane are 0, the scanning points in the same horizontal direction as ground scanning points; determine, if an angle between a connection line of two adjacent non-ground scanning points and a scanning direction of one of the non-ground scanning points is within a set range, that the two non-ground scanning points belong to a same object; and determine, if a number of non-ground scanning points belonging to a same object is greater than or equal to the number threshold, the non-ground scanning points belonging to the same object as object scanning points.

In one embodiment, the apparatus further includes a distortion correction module. The distortion correction module is configured to perform distortion correction on the three-dimensional point cloud data of the robot during the movement based on the predicted value of the pose change of the robot during the movement.

In one embodiment, the map establishment module is further configured to classify the three-dimensional point cloud data of the robot during the movement into circular rings with different diameters centered on a position of the robot, and count numbers of scanning points in the circular rings; and if the numbers of the scanning points in the circular rings obtained from the three-dimensional point cloud data collected by the robot twice is the same, determine that the robot goes back to the original point, and ending the establishment of the two-dimensional map.

In one embodiment, the apparatus further includes a path acquisition module and a turning angle determination module. The acquisition module is configured to acquire a movement path of the robot. The turning angle determination module is configured to determine a wheel turning angle of the robot based on the movement path and the current position of the robot.

In one embodiment, the data acquisition module 901 is further configured to acquire an ultrasonic measurement distance of the robot at the current position. Correspondingly, the apparatus further includes a control module. The control module is configured to control the robot to pause the movement if the ultrasonic measurement distance of the robot at the current position is less than a first distance threshold.

Specific limitations on the multi-sensor-fusion-based autonomous mobile robot indoor and outdoor positioning apparatus may be obtained with reference to the limitations on the multi-sensor-fusion-based autonomous mobile robot indoor and outdoor positioning method hereinabove, which are not described in detail herein. The modules in the above multi-sensor-fusion-based autonomous mobile robot indoor and outdoor positioning apparatus may be implemented entirely or partially by software, hardware, or a combination thereof. The above modules may be built in or independent of a processor of a computer device in a hardware form, or may be stored in a memory of the computer device in a software form, so that the processor invokes and performs operations corresponding to the above modules.

Figure 11:
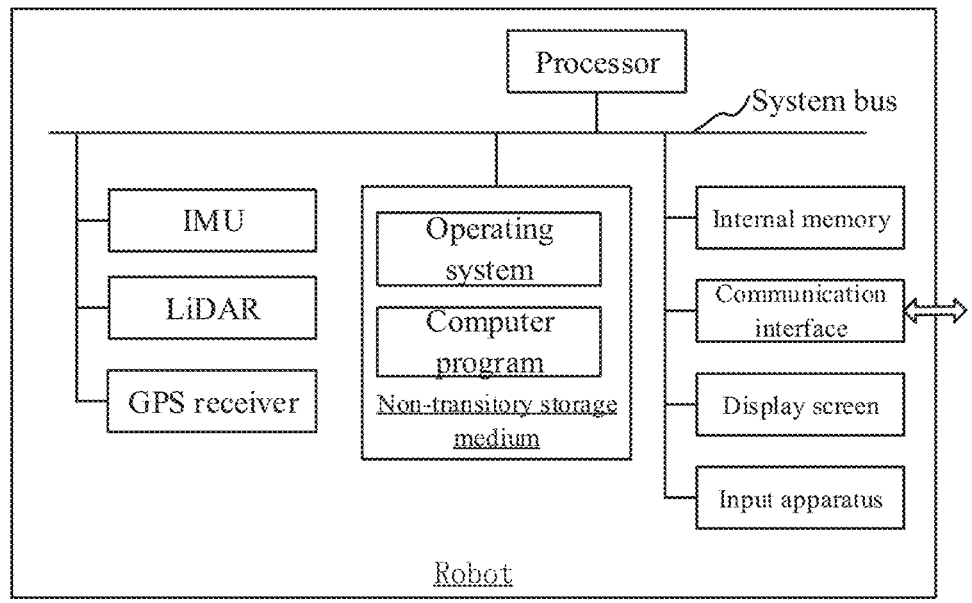
FIG. 11 is a diagram of an internal structure of the robot according to an embodiment.

In one embodiment, a robot is provided, with a diagram of an internal structure thereof shown in FIG. 11. The robot includes a processor, a memory, a communication interface, a display screen, an input apparatus, an IMU, a LiDAR and a GPS receiver that are connected through a system bus. The processor of the robot is configured to provide computing and control capabilities. The memory of the robot includes a non-transitory storage medium and an internal memory. The non-transitory storage medium stores an operating system and a computer program. The internal memory provides an environment for running of the operating system and the computer program in the non-transitory storage medium. The communication interface of the robot is configured to conduct communication with an external terminal in a wired or wireless manner. The wireless manner may be implemented by WIFI, a service provider network, Near field Communication (NFC), or other technologies. The computer program is executed by the processor to implement a multi-sensor-fusion-based autonomous mobile robot indoor and outdoor positioning method. The display screen of the robot may be a liquid crystal display screen or an electronic ink display screen. The input apparatus of the robot may be a touch layer covering the display screen, or may be a key, a trackball, or a touchpad disposed on a housing of the robot, or may be an external keyboard, a touchpad, a mouse, or the like. The IMU, the LiDAR and the GPS receiver of the robot are configured to acquire inertial measurement data, laser point cloud data and GPS information respectively.

Those skilled in the art may understand that, in the structure shown in FIG. 11, only a block diagram of a partial structure related to a solution of the present application is shown, which does not constitute a limitation on the computer device to which the solution of the present application is applied. Specifically, the computer device may include more or fewer components than those shown in the figure, or some components may be combined, or a different component deployment may be used.

In one embodiment, a computer device is further provided, including a memory and a processor. The memory stores a computer program. The processor performs steps in the above method embodiments when executing the computer program.

In one embodiment, a computer-readable storage medium is provided, with a computer program stored thereon. Steps in the above method embodiments are performed when the computer program is executed by a processor.

Those of ordinary skill in the art may understand that some or all procedures in the methods in the above embodiments may be implemented by a computer program instructing related hardware, the computer program may be stored in a non-transitory computer-readable storage medium, and when the computer program is executed, the procedures in the above method embodiments may be implemented. Any reference to a memory, a storage, a database, or other media used in the embodiments provided in the present application may include at least one of a non-transitory memory and a transitory memory. The non-transitory memory may include a read-only memory (ROM), a magnetic tape, a floppy disk, a flash memory, an optical memory or the like. The transitory memory may include a random access memory (RAM) or an external high-speed cache memory. By way of illustration and not limitation, the RAM is available in a variety of forms, such as a static RAM (SRAM) or a dynamic RAM (DRAM).

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present application, which are described specifically and in detail, and therefore cannot be construed as a limitation on the patent scope of the present application. It should be pointed out that those of ordinary skill in the art may also make several changes and improvements without departing from the ideas of the present application, all of which fall within the protection scope of the present application. Therefore, the patent protection scope of the present application shall be subject to the appended claims.

What is claimed is:

1. A multi-sensor-fusion-based autonomous mobile robot indoor and outdoor positioning method, comprising:
    acquiring GPS information and three-dimensional point cloud data of a robot at a current position;
    acquiring, based on a correspondence relationship between GPS information and two-dimensional maps, a two-dimensional map corresponding to the GPS information of the robot at the current position, wherein connection lines between three-dimensional coordinates corresponding to any two points on the two-dimensional map are at a substantially same angle with a horizontal plane, and a pitch angle corresponding to a pose change during a movement of the robot on a same two-dimensional map is less than a set angle;
    projecting the three-dimensional point cloud data of the robot at the current position onto a road surface where the robot is currently moving, to form two-dimensional point cloud data of the robot at the current position by using points closest to the robot from the robot in various directions away from the robot;
    matching the two-dimensional point cloud data of the robot at the current position with the two-dimensional map corresponding to the GPS information of the robot at the current position, and selecting a position with the highest matching degree as the current position of the robot; and
    controlling the robot according to the selected position with the highest matching degree.

2. The method according to claim 1, further comprising:
    controlling the robot to move according to a set route, and acquiring inertial measurement data, GPS information and three-dimensional point cloud data of the robot during the movement;
    determining a pose change of the robot during the movement based on the inertial measurement data of the robot during the movement; and
    projecting the three-dimensional point cloud data of the robot during the movement onto the road surface where the robot is moving, and establishing a two-dimensional map corresponding to the GPS information of the robot during the movement until a pitch angle corresponding to the pose change of the robot during the movement is greater than or equal to a set angle.

3. The method according to claim 2, further comprising:
    separately projecting, if the pitch angle corresponding to the pose change of the robot during the movement is greater than or equal to the set angle, three-dimensional point cloud data after the pitch angle is greater than or equal to the set angle onto the road surface where the robot is moving, and re-establishing a new two-dimensional map corresponding to the GPS information of the robot during the movement until the pitch angle corresponding to the pose change of the robot during the movement is greater than or equal to the set angle again.

4. The method according to claim 2, wherein determining a pose change of the robot during the movement based on the inertial measurement data of the robot during the movement comprises:
    determining a predicted value of the pose change of the robot during the movement based on the inertial measurement data of the robot during the movement;
    determining ground scanning points and object scanning points based on the three-dimensional point cloud data of the robot during the movement;
    performing feature extraction on the ground scanning points and the object scanning points, to determine a line feature point and a plane feature point; and
    substituting the predicted value of the pose change of the robot during the movement, coordinates of the line feature point and coordinates of the plane feature point into an error equation, to determine a pose change in the case of a minimum error value of the error equation as an actual value of the pose change of the robot during the movement.

5. The method according to claim 4, wherein determining ground scanning points and object scanning points based on the three-dimensional point cloud data of the robot during the movement comprises:
    determining angles between connection lines of any of adjacent scanning points in a same horizontal direction and the horizontal plane based on the three-dimensional point cloud data of the robot during the movement;
    determining, if the angles between the connection lines of any of the adjacent scanning points in the same horizontal direction and the horizontal plane are 0, the scanning points in the same horizontal direction as the ground scanning points;
    determining, if an angle between a connection line of two adjacent non-ground scanning points and a scanning direction of one of the two non-ground scanning points is within a set range, that the two non-ground scanning points belong to a same object; and
    determining, if a number of non-ground scanning points belonging to a same object is greater than or equal to a number threshold, the non-ground scanning points belonging to the same object as the object scanning points.

6. The method according to claim 4, further comprising:
    performing distortion correction on the three-dimensional point cloud data of the robot during the movement based on the predicted value of the pose change of the robot during the movement.

7. The method according to claim 2, further comprising:
    classifying the three-dimensional point cloud data of the robot during the movement into circular rings with different diameters centered on a position of the robot, and counting numbers of scanning points in the circular rings; and if the numbers of the scanning points in the circular rings obtained from the three-dimensional point cloud data collected by the robot twice is the same, determining that the robot goes back to an original point, and ending the establishment of the two-dimensional map.

8. The method according to claim 1, further comprising:
acquiring a movement path of the robot; and
determining a wheel turning angle of the robot based on the movement path and the current position of the robot.

9. The method according to claim 1, further comprising:
acquiring an ultrasonic measurement distance of the robot at the current position; and
controlling the robot to pause the movement if the ultrasonic measurement distance of the robot at the current position is less than a first distance threshold.

10. A non-transitory computer-readable storage medium, storing a computer program thereon, wherein when the computer program is executed by a processor, steps of the method according to claim 1 are performed.

11. A robot comprising a processor and a memory coupled to the processor, the memory storing a computer program, wherein when the computer program is executed by the processor, the processor is caused to perform operations comprising:
acquiring GPS information and three-dimensional point cloud data of a robot at a current position;
acquiring, based on a correspondence relationship between GPS information and two-dimensional maps, a two-dimensional map corresponding to the GPS information of the robot at the current position, wherein connection lines between three-dimensional coordinates corresponding to any two points on the two-dimensional map are at a substantially same angle with a horizontal plane and a pitch angle corresponding to a pose change during a movement of the robot on a same two-dimensional map is less than a set angle;
projecting the three-dimensional point cloud data of the robot at the current position onto a road surface where the robot is currently moving, to form two-dimensional point cloud data of the robot at the current position by using points closest to the robot from the robot in various directions away from the robot;
matching the two-dimensional point cloud data of the robot at the current position with the two-dimensional map corresponding to the GPS information of the robot at the current position, and selecting a position with the highest matching degree as the current position of the robot; and
controlling the robot according to the selected position with the highest matching degree.

12. The robot according to claim 11, wherein when the computer program is executed by the processor, the processor is further caused to perform operations comprising:
controlling the robot to move according to a set route, and acquiring inertial measurement data, GPS information and three-dimensional point cloud data of the robot during the movement;
determining a pose change of the robot during the movement based on the inertial measurement data of the robot during the movement; and
projecting the three-dimensional point cloud data of the robot during the movement onto the road surface where the robot is moving, and establishing a two-dimensional map corresponding to the GPS information of the robot during the movement until a pitch angle corresponding to the pose change of the robot during the movement is greater than or equal to a set angle.

13. The robot according to claim 12, wherein when the computer program is executed by the processor, the processor is further caused to perform operations comprising:
separately projecting, if the pitch angle corresponding to the pose change of the robot during the movement is greater than or equal to the set angle, three-dimensional point cloud data after the pitch angle is greater than or equal to the set angle onto the road surface where the robot is moving, and re-establishing a new two-dimensional map corresponding to the GPS information of the robot during the movement until the pitch angle corresponding to the pose change of the robot during the movement is greater than or equal to the set angle again.

14. The robot according to claim 12, wherein determining a pose change of the robot during the movement based on the inertial measurement data of the robot during the movement comprises:
determining a predicted value of the pose change of the robot during the movement based on the inertial measurement data of the robot during the movement;
determining ground scanning points and object scanning points based on the three-dimensional point cloud data of the robot during the movement;
performing feature extraction on the ground scanning points and the object scanning points, to determine a line feature point and a plane feature point; and
substituting the predicted value of the pose change of the robot during the movement, coordinates of the line feature point and coordinates of the plane feature point into an error equation, to determine a pose change in the case of a minimum error value of the error equation as an actual value of the pose change of the robot during the movement.

15. The robot according to claim 14, wherein determining ground scanning points and object scanning points based on the three-dimensional point cloud data of the robot during the movement comprises:
determining angles between connection lines of any of adjacent scanning points in a same horizontal direction and the horizontal plane based on the three-dimensional point cloud data of the robot during the movement;
determining, if the angles between the connection lines of any of the adjacent scanning points in the same horizontal direction and the horizontal plane are 0, the scanning points in the same horizontal direction as the ground scanning points;
determining, if an angle between a connection line of two adjacent non-ground scanning points and a scanning direction of one of the two non-ground scanning points is within a set range, that the two non-ground scanning points belong to a same object; and
determining, if a number of non-ground scanning points belonging to a same object is greater than or equal to a number threshold, the non-ground scanning points belonging to the same object as the object scanning points.

16. The robot according to claim 14, wherein when the computer program is executed by the processor, the processor is further caused to perform operations comprising:
performing distortion correction on the three-dimensional point cloud data of the robot during the movement based on the predicted value of the pose change of the robot during the movement.

17. The robot according to claim 12, wherein when the computer program is executed by the processor, the processor is further caused to perform operations comprising:
- classifying the three-dimensional point cloud data of the robot during the movement into circular rings with different diameters centered on a position of the robot, and counting numbers of scanning points in the circular rings; and
- if the numbers of the scanning points in the circular rings obtained from the three-dimensional point cloud data collected by the robot twice is the same, determining that the robot goes back to an original point, and ending the establishment of the two-dimensional map.

18. The robot according to claim 11, wherein when the computer program is executed by the processor, the processor is further caused to perform operations comprising:
- acquiring a movement path of the robot; and
- determining a wheel turning angle of the robot based on the movement path and the current position of the robot.

19. The robot according to claim 11, wherein when the computer program is executed by the processor, the processor is further caused to perform operations comprising:
- acquiring an ultrasonic measurement distance of the robot at the current position; and
- controlling the robot to pause the movement if the ultrasonic measurement distance of the robot at the current position is less than a first distance threshold.

* * * * *